(12) United States Patent
Huang et al.

(10) Patent No.: US 7,760,794 B2
(45) Date of Patent: Jul. 20, 2010

(54) METHOD AND APPARATUS FOR PERFORMING JOINT CHANNEL EQUALIZATION

(75) Inventors: Yuejin Huang, Holbrook, NY (US); Rui Yang, Greenlawn, NY (US)

(73) Assignee: InterDigital Technology Corporation, Wilmington, DE (US)

(*) Notice: Subject to any disclaimer, the term of this patent is extended or adjusted under 35 U.S.C. 154(b) by 769 days.

(21) Appl. No.: 11/734,101

(22) Filed: Apr. 11, 2007

(65) Prior Publication Data
US 2007/0242767 A1    Oct. 18, 2007

Related U.S. Application Data

(60) Provisional application No. 60/792,239, filed on Apr. 14, 2006.

(51) Int. Cl.
*H04B 1/00*    (2006.01)
*H04L 1/02*    (2006.01)
(52) U.S. Cl. .................................. 375/148; 375/347
(58) Field of Classification Search ................ 375/130, 375/140, 143, 144, 147, 148, 152, 232, 233, 375/234, 235, 236, 260, 267, 316, 340, 343, 375/346–350; 708/100, 200, 300, 322, 323, 708/400, 403–405
See application file for complete search history.

(56) References Cited

U.S. PATENT DOCUMENTS

2003/0123582 A1*  7/2003  Kim et al. .................... 375/347
2003/0125090 A1*  7/2003  Zeira ........................... 455/562
2004/0228392 A1*  11/2004  Zhang et al. ................ 375/148

OTHER PUBLICATIONS

Andrews, "Interference Cancellation For Cellular Systems: A Contemporary Overview", Modulation, Coding And Signal Processing For Wireless Communications, pp. 19-29, (Apr. 2005).
Golub et al., "4.7.6 The Unsymmetric Case", *Matrix Computation*, The Johns Hopkins University Press, 3rd Edition, pp. 201-205, (1996).
McDonough et al., "10.12 Linear Minimum Error Variance Estimation", *Detection of Signals In Noise*, Academic Press, 2$^{nd}$ Edition, pp. 434-438, (1995).
Verdu, *Multiuser Detection*, Cambridge University Press, (1998).

* cited by examiner

*Primary Examiner*—David C Payne
*Assistant Examiner*—Vineeta S Panwalkar
(74) *Attorney, Agent, or Firm*—Volpe and Koenig PC (57) ABSTRACT

A method and apparatus for performing joint channel equalization (JCE) are disclosed. JCE is implemented to reject inter-cell and intra-cell interference in a receiver. The JCE only requires the channel responses of a desired signal and interferers with respect to different antennas. In order to implement JCE, a number of discrete Fourier transforms (DFTs) and an inverse discrete Fourier transform (IDFT) are performed and a number of independent linear systems are solved. With M antennas, the JCE is capable of completely rejecting M−1 interferers. Over-sampling with diversity may be used to increase observation dimensions to a certain extent so that a receiver with M antennas may be able to reject more than M−1 interferers.

20 Claims, 3 Drawing Sheets

METHOD AND APPARATUS FOR PERFORMING JOINT CHANNEL EQUALIZATION

CROSS REFERENCE TO RELATED APPLICATION

This application claims the benefit of U.S. Provisional Application No. 60/792,239 filed Apr. 14, 2006, which is incorporated by reference as if fully set forth.

FIELD OF INVENTION

The present invention is related to wireless communication systems. More particularly, the present invention is related to a method and apparatus for performing joint channel equalization (JCE).

BACKGROUND

In a cellular wireless communication system, a mobile terminal suffers very strong interference from adjacent cells when the mobile terminal approaches a cell boundary. This results in significant performance degradation. Although many techniques, such as multi-user detection (MUD) and interference cancellation, have been proposed to mitigate multiple access interference (MAI) at base stations, there is little interest in mitigating the interference in mobile terminals. Conventional techniques proposed for base stations require substantial information about the interferers, which may not be available at the mobile terminal. Thus, conventional techniques are usually too complicated to be implemented in mobile terminals.

SUMMARY

The present invention is related to a method and apparatus for performing JCE, which is implemented to reject inter-cell and intra-cell interference in a receiver. The JCE only requires the channel responses of a desired signal and interferers with respect to different antennas. In order to implement JCE, a conventional matrix inversion is replaced by a number of discrete Fourier transforms (DFTs) and an inverse discrete Fourier transform (IDFT) as well as solving a number of independent linear systems. With M antennas, the JCE is capable of completely rejecting M−1 interferers. Over-sampling with diversity may be used to increase observation dimensions to a certain extent so that a receiver with M antennas may be able to reject more than M−1 interferers.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment. When referred to hereafter, the terminology "transmitter" and "receiver" may be either a WTRU or a base station.

The present invention implements JCE to reject inter-cell and intra-cell interference in a receiver. The JCE only requires the channel responses of the desired signal and interferers with respect to different antennas. With M antennas, the JCE is capable of completely rejecting M−1 interferers. For example, because the maximum number of interferers in wideband code division multiple access (WCDMA) is only three, a WTRU with four (4) antennas can reject all of the interferers. Over-sampling with diversity may be used to increase observation dimensions to a certain extent so that a receiver with M antennas may be able to reject more than M−1 interferers. In addition, the JCE also removes the effects of multi-path propagation on the desired signal, which is essential to reject further the intra-cell interference in de-spreading. When the observation dimensions are less than four, the JCE rejects some of the interferers and still outperforms a conventional single channel equalizer.

The present invention may be implemented in any wireless communication systems including, but not limited to, WCDMA, time division duplex (TDD), frequency division duplex (FDD), time division synchronous code division multiple access (TD-SCDMA), and CDMA2000 systems.

Figure 1:
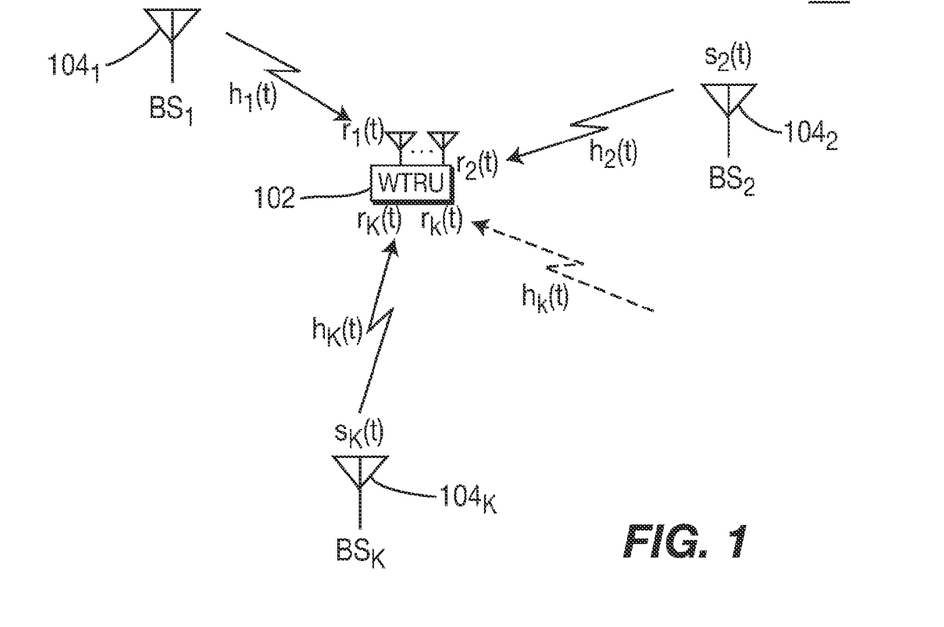
FIG. 1 shows an exemplary system model in accordance with the present invention.

FIG. 1 shows an exemplary system model in accordance with the present invention. The system 100 includes a WTRU 102 and a plurality of base stations $104_1$-$104_K$. The WTRU 102 preferably includes M antennas. The received signal at the m-th antenna of the WTRU 102 is represented as follows:

$$r_m(t) = \sum_{k=1}^{K} h_{m,k}(t) * s_k(t) + n_m(t) = \sum_{k=1}^{K} r_{m,k}(t) + n_m(t); \quad \text{Equation (1)}$$

where '*' denotes convolution, $s_k(t)$ is the signal transmitted from the k-th base station, $h_{m,k}(t)$ is the channel response between the m-th antenna of the WTRU 102 and the k-th base station, $r_{m,k}(t)$ is the received signal at the m-th antenna from the k-th base station, ($r_{m,k}(t)=h_{m,k}(t)*s_k(t)$), and $n_m(t)$ is a noise at the m-th antenna. It is assumed that the signal $s_k(t)$ is a superposition of ideal spread modulated sequences and all the distortions, (such as chip shaping, filtering in radio frequency (RF), attenuation in wireless propagation, beam forming at the receiver, and the like), are included in the channel response $h_{m,k}(t)$.

Suppose that base station $104_1$ is communicating with the WTRU 102. In the received signal $r_m(t)$, the signal $r_{m,1}(t)$ is the desired signal from base station $104_1$ and the signal $r_{m,k}(t)$ for k∈[2, . . . , K] are interferers. In the WTRU 102, the received signal $r_m(t)$ for m∈[1, 2, . . . , M] are sampled for digital processing.

Figure 2:
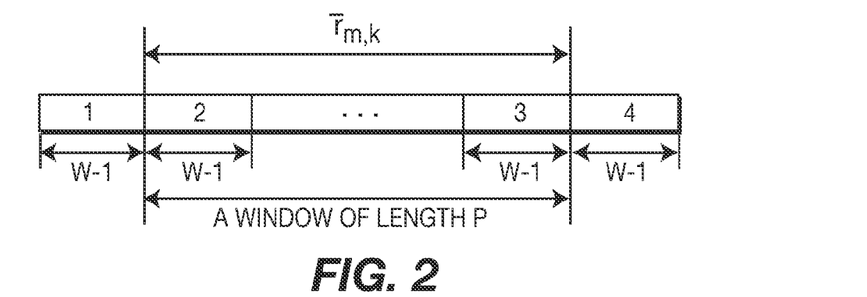
FIG. 2 shows a processing window in accordance with the present invention.

The samples are processed segment by segment. FIG. 2 shows samples $r_{m,k}(t)$ in a processing window, denoted by $\bar{r}_{m,k} \in C^{P \times 1}$. The number of samples in the window is P. The sampled channel response $h_{m,k}(t)$ is represented as follows:

$$\bar{h}_{m,k} = [h_{m,k}^{(0)}, h_{m,k}^{(1)}, h_{m,k}^{(W-1)}]^T; \quad \text{Equation (2)}$$

where W is the maximum delay spread, (i.e., channel length), in chips for all channels.

In the processing window, the first W−1 elements of $\bar{r}_{m,k}$ in Area 2 include two components: (1) $v_{m,k}^{(1)} \in C^{(W-1) \times 1}$ generated from the last W−1 elements of the previous processing window (Area 1) due to multipath propagation and (2) others. The first W−1 elements of the next processing window (Area 4) also include two components: (1) $v_{m,k}^{(2)} \in C^{(W-1) \times 1}$ generated only from the last W−1 elements of the current processing window (Area 3) due to multipath propagation and (2) others. Suppose there is a vector $\bar{i}_{m,k} \in C^{P \times 1}$ in which the first W−1 elements comprise $v_{m,k}^{(1)} - v_{m,k}^{(2)}$ and other P−W+1 elements are all zero. The received signal can be written as follows:

$$\bar{r}_{m,k} = H_{m,k} \cdot \bar{s}_k + \bar{i}_{m,k}; \quad \text{Equation (3)}$$

where $\bar{s}_k \in C^{P \times 1}$ is the sampled $s_k(t)$ in the window and $H_{m,k} \in C^{P \times P}$ is a circulant matrix of the form:

$$H_{m,k} = \begin{bmatrix} h_{m,k}^{(0)} & & & & & & & h_{m,k}^{(W-1)} & . & h_{m,k}^{(1)} \\ h_{m,k}^{(1)} & h_{m,k}^{(0)} & & & & & & & . & . \\ . & . & . & & & & & & & h_{m,k}^{(W-1)} \\ . & h_{m,k}^{(1)} & . & & & & & & & h_{m,k}^{(W-1)} \\ h_{m,k}^{(W-1)} & . & . & & & & & & & \\ & h_{m,k}^{(W-1)} & . & . & & & & & & \\ & & . & . & . & & & & & \\ & & . & . & h_{m,k}^{(0)} & & & & & \\ & & . & . & h_{m,k}^{(1)} & . & & & & \\ & & & . & . & . & h_{m,k}^{(0)} & & & \\ & & & & & h_{m,k}^{(W-1)} & . & h_{m,k}^{(1)} & h_{m,k}^{(0)} & \end{bmatrix} \quad \text{Equation (4)}$$

Therefore, at the m-th antenna, the sampled $r_m(t)$ in the window can be represented as follows:

$$\bar{r}_m = \sum_{k=1}^{K} H_{m,k} \cdot \bar{s}_k + \bar{w}_m; \quad \text{Equation (5)}$$

where $\bar{w}_m = \bar{i}_m + \bar{n}_m$ and $$\bar{i}_m = \sum_{k=1}^{K} \bar{i}_{m,k} \in C^{P \times 1}.$$

Let $\bar{r} = [\bar{r}_1^T \bar{r}_2^T \cdot \bar{r}_M^T]^T \in C^{MP \times 1}$; $\bar{w} = [\bar{w}_1^T \bar{w}_2^T \cdot \bar{w}_M^T]^T \in C^{MP \times 1}$; $H_m = [H_{m,1} H_{m,2} \cdot H_{m,K}] \in C^{P \times KP}$; and $H = [H_1^T H_2^T \cdot H_M^T]^T \in C^{MP \times KP}$. The received signal may be represented as follows:

$$\bar{r} = H \cdot \bar{s} + \bar{w}. \quad \text{Equation (6)}$$

Suppose the covariance matrix of the noise vector $\bar{w}$ is equal to $\sigma^2 \cdot I_{MP}$, where $I_N \in C^{N \times N}$ is an unit diagonal matrix. Then, a minimum mean square error (MMSE) estimate of $\bar{s}$ is approximately given by:

$$\hat{s} = H^H \cdot [H \cdot H^H + \sigma_e^2 \cdot I_{MP}]^{-1} \cdot \bar{r}; \quad \text{Equation (7)}$$

where H denotes a conjugate transpose, $\sigma_e^2 = \sigma^2 / B_f$, the scalar $B_f$ is a balance factor, $\hat{s} = [\hat{s}_1^T \hat{s}_2^T \cdot \hat{s}_K^T]^T \in C^{KP \times 1}$, $\hat{s}_k \in C^{P \times 1}$ is the MMSE estimate of $\bar{s}_k$, and the matrix $H \cdot H^H \in C^{MP \times MP}$ is the channel correlation matrix comprising circulant blocks $\in C^{P \times P}$. The usage of the balance factor $B_f$ is to consider the correlation among chips of each channelization code and hence improves performance. The balance factor may be chosen to be the spreading factor or the number of active channelization codes. In $\hat{s}$, the desired signal $\hat{s}_1$ has been separated from the interferers $\hat{s}_k$ for k=[2, 3, . . . , K] when M>K, which implies that the inter-cell interference from other base stations is rejected completely. To reject intra-cell interference in $\hat{s}_1$, a simple de-spreader is needed because the channelization codes are orthogonal.

Alternatively, the MMSE estimate of $\bar{s}$ may be written as follows:

$$\hat{s} = [H^H \cdot H + \sigma_e^2 \cdot I_{KP}]^{-1} \cdot H^H \cdot \bar{r}; \quad \text{Equation (8)}$$

where $H^H \cdot H \in C^{KP \times KP}$.

If Equations (7) or (8) are implemented directly, a matrix inversion must be performed, which prohibits the algorithm from being used in a WTRU in practice. The present invention provides new efficient methods in which the problem of matrix inversion is avoided.

In accordance with a first embodiment of the present invention, the MMSE estimate of $\bar{s}$ is computed in accordance with Equation (7) while the matrix inversion is replaced with a number of DFT and IDFT as well as solving, either fully or partially, a number of independent linear systems. The DFT and IDFT are practically implemented by fast Fourier transform (FFT) and inverse fast Fourier transform (IFFT), or the like. Using the expression of H, the correlation matrix is written as follows:

$$H \cdot H^H + \sigma_e^2 \cdot I_{MP} = \begin{bmatrix} H_{1,1} & H_{1,2} & . & H_{1,K} \\ H_{2,1} & H_{2,2} & . & H_{2,K} \\ . & . & . & . \\ H_{M,1} & H_{M,2} & . & H_{M,K} \end{bmatrix} \quad \text{Equation (9)}$$

$$\begin{bmatrix} H_{1,1}^H & H_{2,1}^H & . & H_{M,1}^H \\ H_{1,2}^H & H_{2,2}^H & . & H_{M,2}^H \\ . & . & . & . \\ H_{1,K}^H & H_{2,K}^H & . & H_{M,K}^H \end{bmatrix} + \sigma_e^2 \cdot I_{MP}$$

$$= \begin{bmatrix} \sum_{k=1}^{K} H_{1,k} \cdot H_{1,k}^H & \sum_{k=1}^{K} H_{1,k} \cdot H_{2,k}^H & . & \sum_{k=1}^{K} H_{1,k} \cdot H_{M,k}^H \\ \sum_{k=1}^{K} H_{2,k} \cdot H_{1,k}^H & \sum_{k=1}^{K} H_{2,k} \cdot H_{2,k}^H & . & \sum_{k=1}^{K} H_{2,k} \cdot H_{M,k}^H \\ . & . & . & . \\ \sum_{k=1}^{K} H_{M,k} \cdot H_{1,k}^H & \sum_{k=1}^{K} H_{M,k} \cdot H_{2,k}^H & . & \sum_{k=1}^{K} H_{M,k} \cdot H_{M,k}^H \end{bmatrix} +$$

-continued $$\sigma_e^2 \cdot I_{MP} = \begin{bmatrix} V_{11} & V_{12} & . & V_{1M} \\ V_{21} & V_{22} & . & V_{2M} \\ . & . & . & . \\ V_{M1} & V_{M2} & . & V_{MM} \end{bmatrix}.$$

The matrices $V_{ij} \in C^{P \times P}$ for $i,j \in [1, 2, \ldots, K]$ are all circulant matrices. $D_P \in C^{P \times P}$ and $D_P^{-1} \in C^{P \times P}$ denote a P-point DFT matrix and a P-point IDFT matrix, respectively. By DFT decomposition, $V_{ij} = D_P^{-1} \Phi_{ij} D_P$, where $\Phi_{ij} = \mathrm{diag}(D_P V_{ij}(:,1)) \in C^{P \times P}$ is a diagonal matrix whose diagonal elements are DFT of the first column of $V_{ij}$. By substituting this into Equation (9):

$$H \cdot H^H + \sigma_e^2 \cdot I_{MP} = \begin{bmatrix} D_P^{-1} & & & \\ & D_P^{-1} & & \\ & & . & \\ & & & D_P^{-1} \end{bmatrix} \begin{bmatrix} \Phi_{11} & \Phi_{12} & . & \Phi_{1M} \\ \Phi_{21} & \Phi_{22} & . & \Phi_{2M} \\ . & . & . & . \\ \Phi_{M1} & \Phi_{M2} & . & \Phi_{MM} \end{bmatrix} \begin{bmatrix} D_P & & & \\ & D_P & & \\ & & . & \\ & & & D_P \end{bmatrix}.$$

Equation (10)

Similarly, the matrix H can be represented as follows:

$$H = \begin{bmatrix} H_{1,1} & H_{1,2} & . & H_{1,K} \\ H_{2,1} & H_{2,2} & . & H_{2,K} \\ . & . & . & . \\ H_{M,1} & H_{M,2} & . & H_{M,K} \end{bmatrix} \begin{bmatrix} D_P^{-1} & & & \\ & D_P^{-1} & & \\ & & . & \\ & & & D_P^{-1} \end{bmatrix} = \begin{bmatrix} \Lambda_{1,1} & \Lambda_{1,2} & . & \Lambda_{1,K} \\ \Lambda_{2,1} & \Lambda_{2,2} & . & \Lambda_{2,K} \\ . & . & . & . \\ \Lambda_{M,1} & \Lambda_{M,2} & . & \Lambda_{M,K} \end{bmatrix} \begin{bmatrix} D_P & & & \\ & D_P & & \\ & & . & \\ & & & D_P \end{bmatrix};$$

Equation (11)

where $\Lambda_{m,k} = \mathrm{diag}(D_P H_{m,k}(:,1)) \in C^{P \times P}$ for $m \in [1, 2, \ldots, M]$ and $k \in [1, 2, \ldots, K]$ is a diagonal matrix whose diagonal elements are DFT of the first column of $H_{m,k}$. By substituting Equations (10) and (11) into Equation (7):

$$\begin{bmatrix} \hat{s}_1 \\ \hat{s}_2 \\ . \\ \hat{s}_K \end{bmatrix} = \begin{bmatrix} D_P^{-1} & & & \\ & D_P^{-1} & & \\ & & . & \\ & & & D_P^{-1} \end{bmatrix} \begin{bmatrix} \Lambda_{1,1}^H & \Lambda_{2,1}^H & . & \Lambda_{M,1}^H \\ \Lambda_{1,2}^H & \Lambda_{2,2}^H & . & \Lambda_{M,2}^H \\ . & . & . & . \\ \Lambda_{1,K}^H & \Lambda_{2,K}^H & . & \Lambda_{M,K}^H \end{bmatrix}$$

Equation (12)

$$\begin{bmatrix} \Phi_{11} & \Phi_{12} & . & \Phi_{1M} \\ \Phi_{21} & \Phi_{22} & . & \Phi_{2M} \\ . & . & . & . \\ \Phi_{M1} & \Phi_{M2} & . & \Phi_{MM} \end{bmatrix} \begin{bmatrix} D_P & & & \\ & D_P & & \\ & & . & \\ & & & D_P \end{bmatrix} \begin{bmatrix} \bar{r}_1 \\ \bar{r}_2 \\ . \\ \bar{r}_M \end{bmatrix}.$$

$z_m$ and $b_m$ vectors are defined as follows:

$$\begin{bmatrix} z_1 \\ z_2 \\ . \\ z_M \end{bmatrix} = \begin{bmatrix} \Phi_{11} & \Phi_{12} & . & \Phi_{1M} \\ \Phi_{21} & \Phi_{22} & . & \Phi_{2M} \\ . & . & . & . \\ \Phi_{M1} & \Phi_{M2} & . & \Phi_{MM} \end{bmatrix}^{-1} \begin{bmatrix} b_1 \\ b_2 \\ . \\ b_M \end{bmatrix};$$

Equation (13)

and $$\begin{bmatrix} b_1 \\ b_2 \\ . \\ b_M \end{bmatrix} = \begin{bmatrix} D_P & & & \\ & D_P & & \\ & & . & \\ & & & D_P \end{bmatrix} \begin{bmatrix} \bar{r}_1 \\ \bar{r}_2 \\ . \\ \bar{r}_M \end{bmatrix}.$$

Equation (14)

Then, Equation (15) is obtained:

$$\begin{bmatrix} \Phi_{11} & \Phi_{12} & . & \Phi_{1M} \\ \Phi_{21} & \Phi_{22} & . & \Phi_{2M} \\ . & . & . & . \\ \Phi_{M1} & \Phi_{M2} & . & \Phi_{MM} \end{bmatrix} \begin{bmatrix} z_1 \\ z_2 \\ . \\ z_M \end{bmatrix} = \begin{bmatrix} b_1 \\ b_2 \\ . \\ b_M \end{bmatrix}.$$

Equation (15)

Because $\Phi_{ij}$ for $i,j \in [1, 2, \ldots, M]$ are diagonal, it is needed to fully solve P independent M-element complex linear systems to get $z_m$ for $m \in [1, 2, \ldots, M]$. After $z_m$ is computed $\hat{s}_1$ is computed by performing an IDFT on $f_1$, $\hat{s}_k = D_P^{-1} \cdot f_k$ for $k = [2, 3, \ldots, K]$ as follows:

$$\hat{s}_1 = D_P^{-1} \cdot f_1;$$

Equation (16)

where $$f_1 = \sum_{m=1}^{M} \Lambda_{m,1}^H \cdot z_m.$$

Equation (17)

In accordance with a second embodiment of the present invention, the MMSE estimate of $\bar{s}$ is computed in accordance with Equation (8) while the matrix inversion is replaced with a number of DFTs and an IDFT as well as solving, either fully or partially, a number of independent linear systems. With the expression of H, the channel correlation matrix is written as follows:

$$H^H \cdot H + \sigma_e^2 \cdot I_{KP} = \begin{bmatrix} H_{1,1}^H & H_{2,1}^H & \cdots & H_{M,1}^H \\ H_{1,2}^H & H_{2,2}^H & \cdots & H_{M,2}^H \\ \vdots & \vdots & \cdots & \vdots \\ H_{1,K}^H & H_{2,K}^H & \cdots & H_{M,K}^H \end{bmatrix}$$

$$\begin{bmatrix} H_{1,1} & H_{1,2} & \cdots & H_{1,K} \\ H_{2,1} & H_{2,2} & \cdots & H_{2,K} \\ \vdots & \vdots & \cdots & \vdots \\ H_{M,1} & H_{M,2} & \cdots & H_{M,K} \end{bmatrix} + \sigma_e^2 \cdot I_{KP}$$

$$= \begin{bmatrix} \sum_{m=1}^{M} H_{m,1}^H \cdot & \sum_{m=1}^{M} H_{m,1}^H \cdot & \cdots & \sum_{m=1}^{M} H_{m,1}^H \cdot \\ H_{m,1}^H \cdot H_{m,2} & & & H_{m,K} \\ H_{m,1} & & & \\ \sum_{m=1}^{M} H_{m,2}^H \cdot & \sum_{m=1}^{M} H_{m,2}^H \cdot & \cdots & \sum_{m=1}^{M} H_{m,2}^H \cdot \\ H_{m,2}^H \cdot H_{m,2} & & & H_{m,K} \\ H_{m,1} & & & \\ \vdots & \vdots & \cdots & \vdots \\ \sum_{m=1}^{M} H_{m,K}^H \cdot & \sum_{m=1}^{M} H_{m,K}^H \cdot & \cdots & \sum_{m=1}^{M} H_{m,K}^H \cdot \\ H_{m,K}^H \cdot H_{m,2} & & & H_{m,K} \\ H_{m,1} & & & \end{bmatrix} +$$

$$\sigma_e^2 \cdot I_{KP}$$

$$= \begin{bmatrix} T_{11} & T_{12} & \cdots & T_{1K} \\ T_{21} & T_{22} & \cdots & T_{2K} \\ \vdots & \vdots & \cdots & \vdots \\ T_{K1} & T_{K2} & \cdots & T_{KK} \end{bmatrix}.$$

Equation (18)

The matrices $T_{ij} \in C^{P \times P}$ for $i,j \in [1, 2, \ldots, K]$ are all circulant matrices. Therefore, $T_{ij} = D_P^{-1} \Gamma_{ij} D_P$, where $\Gamma_{ij} = \text{diag}(D_P T_{ij}(:,1)) \in C^{P \times P}$ is a diagonal matrix whose diagonal elements are DFT of the first column of $T_{ij}$. Equation (18) is re-written as follows:

$$H^H \cdot H + \sigma_e^2 \cdot I_{KP} = \begin{bmatrix} D_P^{-1} & & & \\ & D_P^{-1} & & \\ & & \ddots & \\ & & & D_P^{-1} \end{bmatrix}$$

$$\begin{bmatrix} \Gamma_{11} & \Gamma_{12} & \cdots & \Gamma_{1K} \\ \Gamma_{21} & \Gamma_{22} & \cdots & \Gamma_{2K} \\ \vdots & \vdots & \cdots & \vdots \\ \Gamma_{K1} & \Gamma_{K2} & \cdots & \Gamma_{KK} \end{bmatrix}$$

$$\begin{bmatrix} D_P & & & \\ & D_P & & \\ & & \ddots & \\ & & & D_P \end{bmatrix}.$$

Equation (19)

Substitution of Equations (11) and (19) into Equation (8) results in:

$$\begin{bmatrix} \hat{s}_1 \\ \hat{s}_2 \\ \vdots \\ \hat{s}_K \end{bmatrix} = \begin{bmatrix} D_P^{-1} & & & \\ & D_P^{-1} & & \\ & & \ddots & \\ & & & D_P^{-1} \end{bmatrix}$$

$$\begin{bmatrix} \Gamma_{11} & \Gamma_{12} & \cdots & \Gamma_{1K} \\ \Gamma_{21} & \Gamma_{22} & \cdots & \Gamma_{2K} \\ \vdots & \vdots & \cdots & \vdots \\ \Gamma_{K1} & \Gamma_{K2} & \cdots & \Gamma_{KK} \end{bmatrix}^{-1}$$

$$\begin{bmatrix} \Lambda_{1,1}^H & \Lambda_{2,1}^H & \cdots & \Lambda_{M,1}^H \\ \Lambda_{1,2}^H & \Lambda_{2,2}^H & \cdots & \Lambda_{M,2}^H \\ \vdots & \vdots & \cdots & \vdots \\ \Lambda_{1,K}^H & \Lambda_{2,K}^H & \cdots & \Lambda_{M,K}^H \end{bmatrix}$$

$$\begin{bmatrix} D_P & & & \\ & D_P & & \\ & & \ddots & \\ & & & D_P \end{bmatrix} \begin{bmatrix} \bar{r}_1 \\ \bar{r}_2 \\ \vdots \\ \bar{r}_M \end{bmatrix}.$$

Equation (20)

$x_k$ and $y_k$ vectors are defined as follows:

$$\begin{bmatrix} x_1 \\ x_2 \\ \vdots \\ x_K \end{bmatrix} = \begin{bmatrix} D_P & & & \\ & D_P & & \\ & & \ddots & \\ & & & D_P \end{bmatrix} \begin{bmatrix} \hat{s}_1 \\ \hat{s}_2 \\ \vdots \\ \hat{s}_K \end{bmatrix},$$

Equation (21)

and $$\begin{bmatrix} y_1 \\ y_2 \\ \vdots \\ y_K \end{bmatrix} = \begin{bmatrix} \Lambda_{1,1}^H & \Lambda_{2,1}^H & \cdots & \Lambda_{M,1}^H \\ \Lambda_{1,2}^H & \Lambda_{2,2}^H & \cdots & \Lambda_{M,2}^H \\ \vdots & \vdots & \cdots & \vdots \\ \Lambda_{1,K}^H & \Lambda_{2,K}^H & \cdots & \Lambda_{M,K}^H \end{bmatrix}$$

$$\begin{bmatrix} D_P & & & \\ & D_P & & \\ & & \ddots & \\ & & & D_P \end{bmatrix} \begin{bmatrix} \bar{r}_1 \\ \bar{r}_2 \\ \vdots \\ \bar{r}_M \end{bmatrix}.$$

Equation (22)

Then, Equation (23) is obtained:

$$\begin{bmatrix} \Gamma_{11} & \Gamma_{12} & \cdots & \Gamma_{1k} \\ \Gamma_{21} & \Gamma_{22} & \cdots & \Gamma_{2k} \\ \vdots & \vdots & \cdots & \vdots \\ \Gamma_{K1} & \Gamma_{K2} & \cdots & \Gamma_{KK} \end{bmatrix} \begin{bmatrix} x_1 \\ x_2 \\ \vdots \\ x_K \end{bmatrix} = \begin{bmatrix} y_1 \\ y_2 \\ \vdots \\ y_K \end{bmatrix}.$$

Equation (23)

Because $\Gamma_{ij}$ for $i,j \in [1, 2, \ldots, K]$ are diagonal, it is needed to partially solve P independent K-element complex linear systems to get $x_1$. After $x_1$ is computed, $\hat{s}_1$ is computed by performing an IDFT on $x_1$ as follows:

$$\hat{s}_1 = D_P^{-1} \cdot x_1.$$

Equation (24)

Equation (23) may be fully solved to obtain $\hat{s}_k = D_P^{-1} \cdot x_k$ for $k = [2, 3, \ldots, K]$ if necessary.

The difference in computation between the first and second embodiments is only in the process of solving the linear systems. In the first embodiment, it is needed to fully solve M-element linear systems. However, in the second embodiment, it is needed only to partially solve K-element linear systems. When over-sampling with diversity is used, the first embodiment needs to fully solve L-element linear systems, where L=M·Q and Q is the over-sampling rate, which will be explained in detail hereafter. Therefore, the second embodiment is more efficient than the first embodiment unless K is much larger than L.

Figure 3:
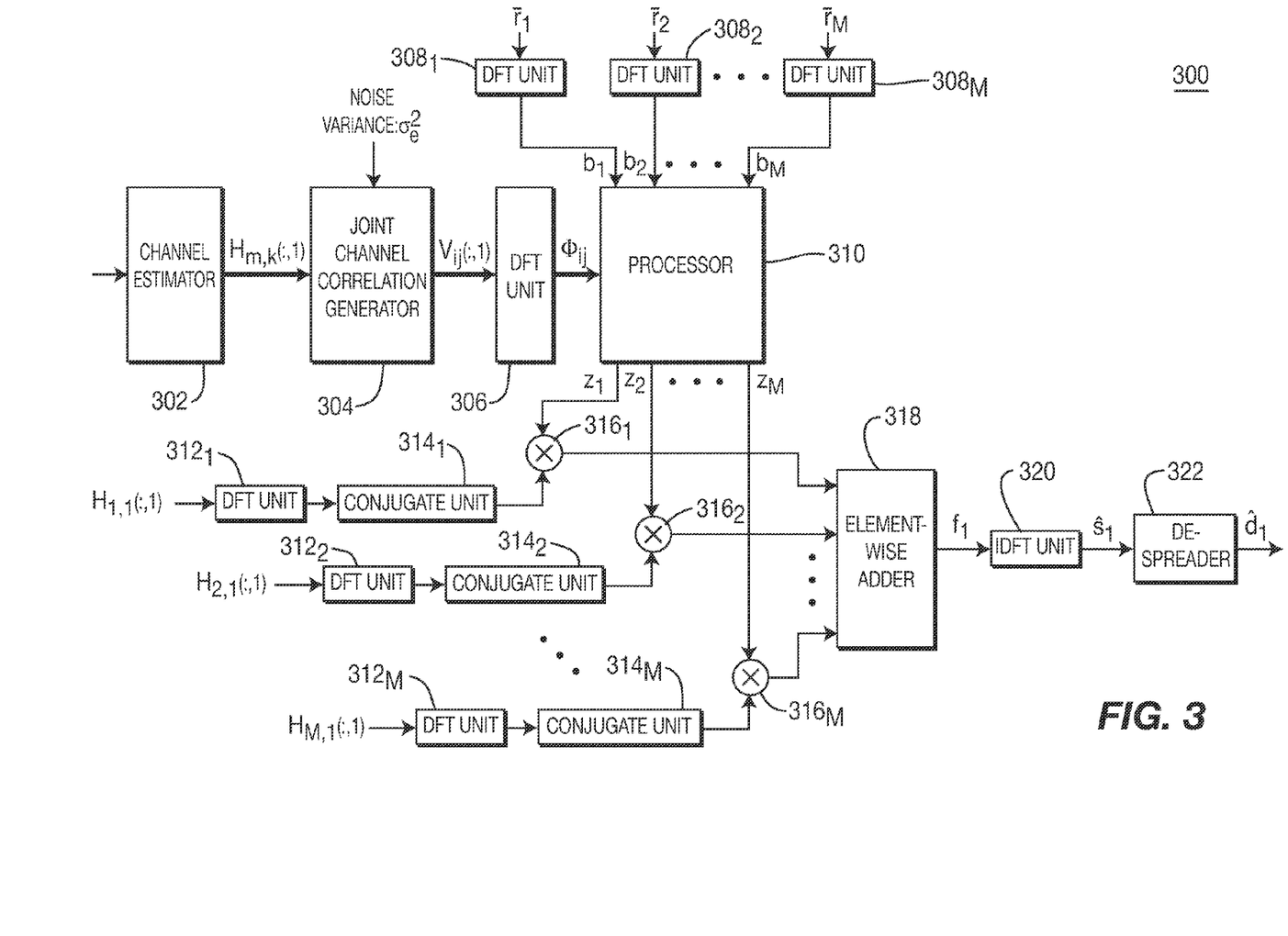
FIG. 3 is a block diagram of a receiver configured in accordance with a first embodiment of the present invention.

FIG. 3 is a block diagram of a receiver 300 configured in accordance with a first embodiment of the present invention. The receiver 300 includes a plurality of antennas (not shown), a channel estimator 302, a joint channel correlation generator 304, a plurality of DFT units 306, $308_1$-$308_M$ and $312_1$-$312_M$, a processor 310, a plurality of conjugate units $314_1$-$314_M$, a plurality of element-wise multipliers $316_1$-$316_M$, an element-wise adder 318, an IDFT unit 320 and a despreader 322. The signals transmitted from a plurality of transmitters are received by the antennas. It is assumed that the signal $s_1$ transmitted by the first transmitter is the desired signal. The channel estimator 302 performs a channel estimation to generate MK channel matrices for channels between each of M antennas and K transmitters and outputs the channel matrices to the joint channel correlation generator 304, which computes channel correlation matrices as per Equation (9) from the channel matrices and outputs the channel correlation matrices to the DFT unit 306. The DFT unit 306 generates first diagonal matrices of the channel correlation matrices as per Equation (10).

The signals received by each of the antennas enter into the corresponding DFT units $308_1$-$308_M$. The DFT units $308_1$-$308_M$ perform a DFT on the received signals, generating a $b_m$ vector as per Equation (14). The processor 310 then computes a $z_m$ vector as per Equation (13) by solving a plurality of independent linear systems with the first diagonal matrices and the $b_m$ vector.

The first column of the channel matrices generated by the channel estimator 302 is sent to the DFT units $312_1$-$312_M$, which perform DFT decomposition of the channel matrix to generate second diagonal matrices. The conjugate units $314_1$-$314_M$ then compute a conjugate transpose of the second diagonal matrices. Each of the element-wise multipliers $316_1$-$316_M$ element-wise multiplies the corresponding conjugate transpose of the second diagonal matrices and the corresponding elements of the $z_m$ vector. The outputs of the element-wise multipliers are element-wise added by the element-wise adder 318 to generate $f_1$ as per Equation (17). The IDFT unit 320 then performs an IDFT on an output of the element-wise adder 318 to compute an estimate of the signal $\hat{s}_1$ transmitted by the desired transmitter, (transmitter 1) as per Equation (16). The estimated signal $\hat{s}_1$ is then despread by the despreader 322 to generate data $\hat{d}_1$.

Figure 4:
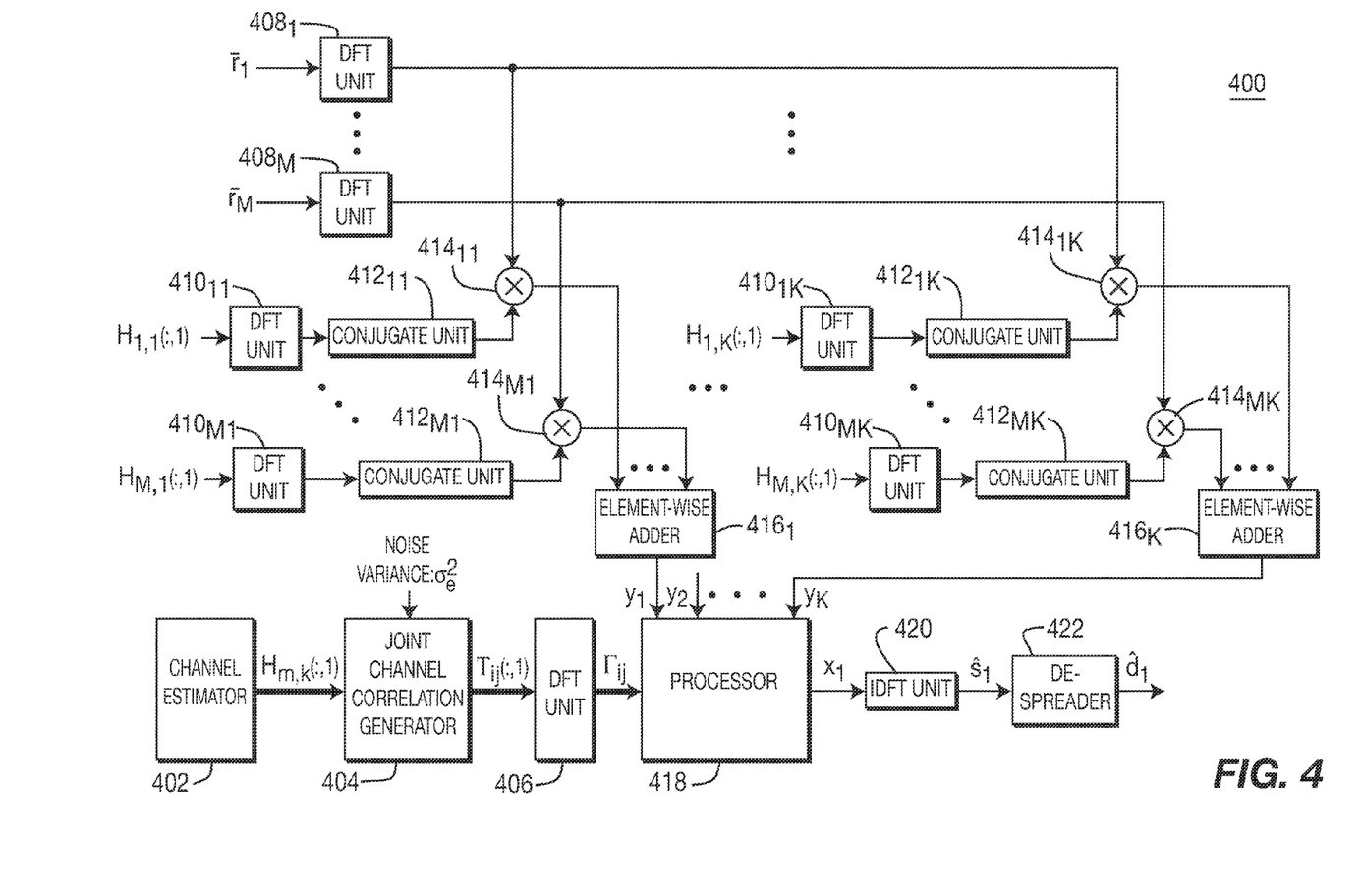
FIG. 4 is a block diagram of a receiver configured in accordance with a second embodiment of the present invention.

FIG. 4 is a block diagram of a receiver 400 configured in accordance with a second embodiment of the present invention. The receiver 400 includes a plurality of antennas (not shown), a channel estimator 402, a joint channel correlation generator 404, a plurality of DFT units 406, $408_1$-$408_M$ and $410_{11}$-$410_{MK}$, a plurality of conjugate units $412_{11}$-$412_{MK}$, a plurality of element-wise multipliers $414_{11}$-$414_{MK}$, a plurality of element-wise adders $416_1$-$416_K$, a processor 418, an IDFT unit 420 and a despreader 422. The signals transmitted from a plurality of transmitters are received by the antennas. It is assumed that the signal $s_1$ transmitted by the first transmitter is the desired signal. The channel estimator 402 performs a channel estimation to generate MK channel matrices for channels between each of the M antennas and K transmitters and outputs the channel matrices to the joint channel correlation generator 404.

The joint channel correlation generator 404 computes channel correlation matrices as per Equation (18) from the channel matrices and outputs the channel correlation matrices to the DFT unit 406. The DFT unit 406 generates first diagonal matrices of the channel correlation matrices as per Equation (19). The signals received by each of the M antennas enter into the corresponding one of the DFT units $408_1$-$408_M$, which perform a DFT on the received signals, generating a $b_m$ vector as per Equation (14).

Each of the MK channel matrices generated by the channel estimator 402 is sent to the corresponding one of the DFT units $410_{11}$-$410_{MK}$, which perform DFT decomposition of the channel matrices to generate second diagonal matrices. The conjugate units $412_{11}$-$412_{MK}$ then compute a conjugate transpose of the second diagonal matrices. Each of the element-wise multipliers $414_{11}$-$414_{MK}$ element-wise multiplies the corresponding conjugate transpose of the second diagonal matrices and the corresponding elements of the outputs of the DFT units $408_1$-$408_M$. The outputs of the element-wise multipliers $414_{11}$-$414_{MK}$ are element-wise added by the element-wise adders $416_{11}$-$416_{MK}$ to generate a $y_m$ vector as per Equation (22).

The processor 418 then computes an $x_1$ as per Equation (21) by solving a plurality of independent linear systems with the first diagonal matrices and the $y_m$ vector. The IDFT unit 420 then performs an IDFT on the output of the processor 418 to compute an estimate of the signal $\hat{s}_1$ transmitted by the desired transmitter, (transmitter 1) as per Equation (24). The estimated signal $\hat{s}_1$ is then despread by the despreader 422 to generate data $\hat{d}_1$.

Figure 5:
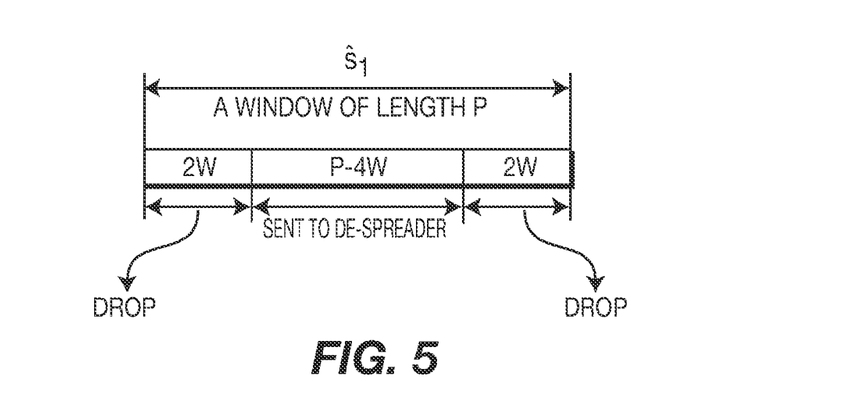
FIG. 5 shows a processing window for avoiding errors in accordance with the present invention.

In the first and second embodiments, it is assumed that $H_{m,k}$ in Equation (4) is circulant while the error due to the circulant matrix approximation has been moved to the vector $\bar{i}_m$. Note that $\bar{w}_m = \bar{i}_m + \bar{n}_m$. In accordance with another embodiment of the present invention, at least 2 W elements on both sides of the estimated $\hat{s}_1$ of length P are dropped to remove the error. FIG. 5 shows the processing window for error avoidance in accordance with this embodiment. Since the matrix $H^H \cdot [H \cdot H^H + \sigma_e^2 \cdot I_{MP}]^{-1}$ in Equation (7) or $[H^H \cdot H + \sigma_e^2 \cdot I_{KP}]^{-1} \cdot H^H$ in Equation (8) has a banded structure, this approach works well as far as the window length P is much larger than W, which is easily satisfied in implementation.

In order to reduce the effect of timing error, the first and second embodiments may be implemented with over-sampling. In such case, the signal $r_m(t)$ is over-sampled by a rate of Q. Therefore, total Q·P samples exist in the processing window. The sampled $r_m(t)$ comprises $\bar{r}_m^{(1)}, \bar{r}_m^{(2)}, \ldots, \bar{r}_m^{(Q)} \in \mathbb{C}^{P \times 1}$, where the element space in each of the Q vectors is the chip duration. The first element of the vector $\bar{r}_m^{(q)}$ (q∈[1, 2, ..., Q]) is the q-th sample in the total Q·P samples in the processing window. Besides mitigating the timing error, over-sampling with diversity may also increase observation dimensions to a certain extent so that a receiver with M antennas may be able to reject more than M−1 interferers. Two options are provided to use the over-sampled signals: selection and diversity.

In the first option, one signal is selected from the over-sampled Q candidate signals in the sense of minimizing the timing error. With over-sampling, the Q discrete channel responses between the m-th antenna and k-th transmitter are denoted by:

$$\bar{h}_{m,k,q} = [h_{m,k,q}^{(0)}, h_{m,k,q}^{(1)}, \ldots, h_{m,k,q}^{(W-1)}]^T$$
for q∈[1, 2, ... Q]. Equation (25)

With these channel responses, the following is computed for each transmitter and over-sampling location:

$$G_k(q) = \sum_{m=1}^{M} \bar{h}_{m,k,q}^H \cdot \bar{h}_{m,k,q}. \quad \text{Equation (26)}$$

It is assumed that the signal from the first transmitter is the desired one. Then, the over-sampling index generating the maximum $G_k$ of Equation (26) is selected with respect to the first transmitter such that $G_1(q) = \max\{G_1(1), G_1(2), \ldots, G_1(Q)\}$. Once the over-sampling index is selected, the samples with the selected over-sampling index are selected as the samples for processing:

$$\bar{r}_m = \bar{r}_m^{(q)}, \text{ for } m \in [1, 2, \ldots, M]. \quad \text{Equation (27)}$$

The channel response of the desired signal is chosen as follows:

$$\bar{h}_{m,1} = \bar{h}_{m,1,q}. \quad \text{Equation (28)}$$

The channel response $\bar{h}_{m,k}$ is chosen as follows:

$$\bar{h}_{m,k} = \bar{h}_{m,k,1}; \quad \text{Equation (29)}$$

with $G_k(1) = \max\{G_k(1), G_k(2), \ldots, G_k(Q)\}$. When channel estimation is updated, the selection should be performed again.

In the second option, the over-sampled signals and the channel responses are combined not only to mitigate the timing error but also to increase the observation dimensions. The over-sampled channel responses between the m-th antenna and k-th transmitter are given in Equation (25). Once the sampled channel response $\bar{h}_{m,k,q}$ is generated, the channel matrix $H_{m,k,q}$ is constructed. The matrix $H_{m,k,q}$ takes the same form as $H_{m,k}$ in Equation (4) except that $h_{m,k}^{(l)}$ is replaced by $h_{m,k,q}^{(l)}$ for $l = [0, 1, \ldots, W-1]$. The over-sampled channel responses $\bar{h}_{m,k,q}$ and the received signal vectors $\bar{r}_m^{(q)}$ are treated as those obtained from different antennas, which results in the increase of observation dimensions to a certain extent.

The changes of computational complexity in the first and second embodiments using over-sampling with diversity are different. For simplicity, an example of M=1 and Q=2 is explained. The result is easily extended to the cases of M>1 and Q>2. When M=1 and Q=2, $$\bar{r} = \left[ (\bar{r}_1^{(1)})^T \ (\bar{r}_1^{(2)})^T \right]^T \in C^{QP \times 1}; \quad \text{Equation (30)}$$

$$\bar{w} = \left[ (\bar{w}_1^{(1)})^T \ (\bar{w}_1^{(2)})^T \right]^T \in C^{QP \times 1}; \text{ and} \quad \text{Equation (31)}$$

$$H = \begin{bmatrix} H_{1,1,1} & H_{1,2,1} & \cdots & H_{1,K,1} \\ H_{1,1,2} & H_{1,2,2} & \cdots & H_{1,K,2} \end{bmatrix} \in C^{QP \times KP}; \quad \text{Equation (32)}$$

where $\bar{w}_1^{(1)}$ and $\bar{w}_1^{(2)} \in C^{P \times 1}$ are the noise vectors corresponding to the over-sampling.

Suppose $H_{1,k,q} = D_P^{-1} \Lambda_{1,k,q} D_P$, where $\Lambda_{1,k,q} = \text{diag}(D_P H_{1,k,q}(:,1)) \in C^{P \times P}$ is diagonal. Then, the channel matrix H can be written as follows:

$$H = \begin{bmatrix} D_P^{-1} & \\ & D_P^{-1} \end{bmatrix} \begin{bmatrix} \Lambda_{1,1,1} & \Lambda_{1,2,1} & \cdots & \Lambda_{1,K,1} \\ \Lambda_{1,1,2} & \Lambda_{1,2,2} & \cdots & \Lambda_{1,K,2} \end{bmatrix} \begin{bmatrix} D_P & \\ & D_P \end{bmatrix}. \quad \text{Equation (33)}$$

In accordance with the first embodiment, the diagonal matrices as per Equation (10) are computed as follows:

$$H \cdot H^H + \sigma_e^2 \cdot I_{2P} = \begin{bmatrix} H_{1,1,1} & H_{1,2,1} & \cdots & H_{1,K,1} \\ H_{1,1,2} & H_{1,2,2} & \cdots & H_{1,K,2} \end{bmatrix} \quad \text{Equation (34)}$$

$$\begin{bmatrix} H_{1,1,1}^H & H_{1,1,2}^H \\ H_{1,2,1}^H & H_{1,2,2}^H \\ \vdots & \vdots \\ H_{1,K,1}^H & H_{1,K,2}^H \end{bmatrix} + \sigma_e^2 \cdot I_{2P}$$

$$= \begin{bmatrix} \sum_{k=1}^{K} H_{1,k,1} \cdot H_{1,k,1}^H & \sum_{k=1}^{K} H_{1,k,1} \cdot H_{1,k,2}^H \\ \sum_{k=1}^{M} H_{1,k,2} \cdot H_{1,k,1}^H & \sum_{k=1}^{M} H_{1,k,2} \cdot H_{1,k,2}^H \end{bmatrix} +$$

$$\sigma_e^2 \cdot I_{2P}$$

$$= \begin{bmatrix} V_{11} & V_{12} \\ V_{21} & V_{22} \end{bmatrix}.$$

According to Equation (34), L-element linear systems should be solved.

In accordance with the second embodiment, the diagonal matrices as per Equation (19) are computed as follows:

$$\text{Equation (35)}$$

$$H^H \cdot H + \sigma_e^2 \cdot I_{KP} = \begin{bmatrix} H_{1,1,1}^H & H_{1,1,2}^H \\ H_{1,2,1}^H & H_{1,2,2}^H \\ \vdots & \vdots \\ H_{1,K,1}^H & H_{1,K,2}^H \end{bmatrix} \begin{bmatrix} H_{1,1,1} & H_{1,2,1} & \cdots & H_{1,K,1} \\ H_{1,1,2} & H_{1,2,2} & \cdots & H_{1,K,2} \end{bmatrix} +$$

$$\sigma_e^2 \cdot I_{KP}$$

$$= \begin{bmatrix} \sum_{q=1}^{2} H_{1,1,q}^H H_{1,1,q} & \sum_{q=1}^{2} H_{1,1,q}^H H_{1,2,q} & \cdots & \sum_{q=1}^{2} H_{1,1,q}^H H_{1,K,q} \\ \sum_{q=1}^{2} H_{1,2,q}^H H_{1,1,q} & \sum_{q=1}^{2} H_{1,2,q}^H H_{1,2,q} & \cdots & \sum_{q=1}^{2} H_{1,2,q}^H H_{1,K,q} \\ \vdots & \vdots & \vdots & \vdots \\ \sum_{q=1}^{2} H_{1,K,q}^H H_{1,1,q} & \sum_{q=1}^{2} H_{1,K,q}^H H_{1,2,q} & \cdots & \sum_{q=1}^{2} H_{1,K,q}^H H_{1,K,q} \end{bmatrix} +$$

$$\sigma_e^2 \cdot I_{KP}$$

$$= \begin{bmatrix} T_{11} & T_{12} & \cdots & T_{1K} \\ T_{21} & T_{22} & \cdots & T_{2K} \\ \vdots & \vdots & \vdots & \vdots \\ T_{K1} & T_{K2} & \cdots & T_{KK} \end{bmatrix}.$$

According to Equation (35), it is still needed to partially solve K-element linear systems. It implies that the computation complexity in the first embodiment is independent of the number of observation dimensions. However, the computation complexity in the second embodiment changes as Q increases.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method of performing joint channel equalization in a wireless communication system, the method comprising:
   receiving signals from a plurality of transmitters;
   generating samples from the received signals, the samples being processed segment by segment;
   performing a channel estimation to generate channel matrices with respect to each of the transmitters;
   computing channel correlation matrices from the channel matrices;
   decomposing each of the channel correlation matrices to generate first diagonal matrices;
   performing a discrete Fourier transform (DFT) on each of the samples of the received signals;
   computing a Z vector by solving a plurality of independent linear systems with the first diagonal matrices and a corresponding sequence of samples after DFT processing;
   decomposing a channel matrix associated with a desired transmitter to generate a second diagonal matrix;
   computing a conjugate transpose of the second diagonal matrix;
   element-wise multiplying the conjugate transpose of the second diagonal matrix and the Z vector to generate an F vector; and
   performing an inverse discrete Fourier transform (IDFT) on the F vector to compute an estimate of a desired signal.

2. The method of claim 1 wherein W−1 samples are dropped in both sides of each segment, W being a channel length.

3. The method of claim 1 further comprising:
   performing an over-sampling of the received signals with an over-sampling factor of Q such that Q sequences of samples are generated from each of the received signals.

4. The method of claim 3 wherein a sequence of samples having a maximum autocorrelation of channel response is selected from the Q sequences of samples and only the selected sequence of samples is processed.

5. The method of claim 3 wherein all sequences of samples are processed independently.

6. A receiver for performing joint channel equalization in a wireless communication system, the receiver comprising:
   at least one antenna for receiving signals from a plurality of transmitters;
   a sampling unit for generating a sequence of samples from each of the received signals, the sequence of samples being processed segment by segment;
   a channel estimator for performing a channel estimation to generate channel matrices with respect to each of the transmitters;
   a joint channel correlation generator for computing channel correlation matrices from the channel matrices;
   a first discrete Fourier transform (DFT) unit for generating first diagonal matrices of the channel correlation matrices;
   at least one second DFT unit for performing a DFT on the sequence of samples;
   a processor for computing a Z vector by solving a plurality of independent linear systems with the first diagonal matrices and a corresponding sequence of samples after DFT processing;
   at least one third DFT unit for decomposing a channel matrix associated with a desired transmitter to generate a second diagonal matrix;
   at least one conjugate unit for computing a conjugate transpose of the second diagonal matrix;
   at least one element-wise multiplier for element-wise multiplying the conjugate transpose of the second diagonal matrix and the Z vector to generate an F vector; and
   an inverse discrete Fourier transform (IDFT) unit for performing an IDFT on the F vector to compute an estimate of a desired signal.

7. The receiver of claim 6 wherein W−1 samples in both sides of each segment are dropped, W being a channel length.

8. The receiver of claim 6 wherein the sampling unit performs an over-sampling of the received signals with an over-sampling factor of Q such that Q sequences of samples are generated from each of the received signals.

9. The receiver of claim 8 wherein a sequence of samples having a maximum autocorrelation of channel response is selected from the Q sequences of samples and only the selected sequence of samples is processed.

10. The receiver of claim 8 wherein all sequences of samples are processed independently.

11. A method of performing joint channel equalization in a wireless communication system, the method comprising:
   receiving signals from a plurality of transmitters;

generating a sequence of samples from each of the received signals, the sequence of samples being processed segment by segment;

performing a channel estimation to generate channel matrices with respect to each of the transmitters;

computing channel correlation matrices from the channel matrices;

decomposing each of the channel correlation matrices to generate first diagonal matrices;

performing a discrete Fourier transform (DFT) on each sequence of the samples;

decomposing the channel matrices to generate second diagonal matrices;

computing a conjugate transpose of each of the second diagonal matrices;

element-wise multiplying the conjugate transpose of the second diagonal matrices and a corresponding sequence of samples after DFT processing to generate a Y vector;

computing an X vector by solving a plurality of independent linear systems with the first diagonal matrices and the Y vector; and performing an inverse discrete Fourier transform (IDFT) on the X vector to compute an estimate of a signal transmitted by a desired transmitter.

12. The method of claim 11 wherein W−1 samples are dropped in both sides of each segment, W being a channel length.

13. The method of claim 11 further comprising:
performing an over-sampling of the received signals with an over-sampling factor of Q such that Q sequences of samples are generated from each of the received signals.

14. The method of claim 13 wherein a sequence of samples having a maximum autocorrelation of channel response is selected from the Q sequences of samples and only the selected sequence of samples is processed.

15. The method of claim 13 wherein all sequences of samples are processed independently.

16. A receiver for performing joint channel equalization in a wireless communication system, the receiver comprising:
at least one antenna for receiving signals from a plurality of transmitters;

a sampling unit for generating a sequence of samples from each of the received signals, the sequence of samples being processed segment by segment;

a channel estimator for performing a channel estimation to generate channel matrices with respect to each of the transmitters;

a joint channel correlation generator for computing channel correlation matrices from the channel matrices;

a first discrete Fourier transform (DFT) unit for decomposing each of the channel correlation matrices to generate first diagonal matrices;

a plurality of second DFT units for performing a DFT on each sequence of the samples;

a plurality of third DFT units for decomposing the channel matrices to generate second diagonal matrices;

a plurality of conjugate units for computing a conjugate transpose of each of the second diagonal matrices;

a plurality of element-wise multipliers for element-wise multiplying the conjugate transpose of the second diagonal matrices and a corresponding sequence of samples after DFT processing to generate a Y vector;

a processor for computing an X vector by solving a plurality of independent linear systems with the first diagonal matrices and the Y vector; and an inverse discrete Fourier transform (IDFT) unit for performing an IDFT on the X vector to compute an estimate of a desired signal.

17. The receiver of claim 16 wherein W−1 samples in both sides of each segment are dropped, W being a channel length.

18. The receiver of claim 16 wherein the sampling unit performs an over-sampling of the received signals with an over-sampling factor of Q such that Q sequences of samples are generated from each of the received signals.

19. The receiver of claim 18 wherein a sequence of samples having a maximum autocorrelation of channel response is selected from the Q sequences of samples and only the selected sequence of samples is processed.

20. The receiver of claim 18 wherein all sequences of samples are processed independently.

* * * * *